United States Patent Office 3,677,774
Patented July 18, 1972

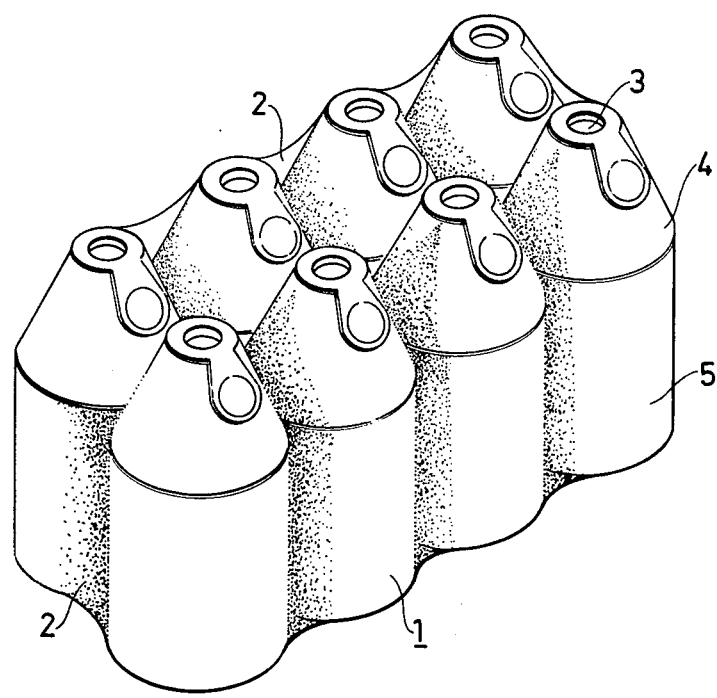

3,677,774
COMBINED PACKAGE CONTAINING AN ENCLOSED GASEOUS ATMOSPHERE FOR PRESERVATION
Anders Ruben Rausing, Rome, Italy, assignor to Sobrefina S.A., Fribourg, Switzerland
Filed Feb. 9, 1970, Ser. No. 9,730
Claims priority, application Sweden, Feb. 25, 1969, 2,539/69
Int. Cl. B65f *31/04*
U.S. Cl. 99—171 B
2 Claims

ABSTRACT OF THE DISCLOSURE

A combined package having extended shelf-life for a plurality of plastic containers for beer or carbonated beverages in which the plastic containers have an unacceptable permeability for carbon dioxide gas which includes a heat-shrunk, sealed envelope enclosing the containers and composed of a plastic material having a low permeability for the carbon dioxide gas, said envelope containing pressurized carbon dioxide gas so that the difference in partial pressures of the gas in the containers and the envelope is less than the difference in partial pressures of the carbon dioxide in the container and the atmosphere.

---

This invention relates to a combined package comprising a number of packaging containers, the contents of which are a liquid and a gas under pressure, and to an envelope of plastic film surrounding the said packaging containers.

There is a need within packaging technology for packaging containers, made of plastic materials, for liquids under pressure. Liquids under pressure such as aerated drinks and beer are traditioinally packed in glass bottles or tin cans which have very good gastight properties. It is a drawback of the traditional packages that they are relatively expensive and heavy and also easy to break as far as glass bottles are concerned. It is also generally known that traditional packages are difficult to destroy and that they may cause serious injury if thrown away in the open country. In order to avoid the above drawbacks, glass bottles and glass packages containing goods not under pressure have largely been superseded by plastic packages, but the problem as regards goods under pressure has been that the gastightness has not, at times, been of a sufficiently high degree. It is naturally possible to increase the thickness of the material in order to increase the gastightness of plastic packages, but this results in the packages being more expensive. In the case of beer packages, for instance, the container must not let out the carbon dioxide dissolved in the beer and must not let in oxygen that would affect the taste of the beer. For relatively short storage periods, i.e. up to a month, passage of carbon dioxide outwards and passage of oxygen inwards poses no appreciable problems in the case of the new plastic packages which have been developed, but in the case of packages that are intended to be stored for longer periods the walls of the container must either be coated with a more impermeable material such as polyvinylidene chloride or the space between the envelope of the combined package and the packaging containers must be filled with a gas, and preferably the same gas as that inside the liquid in the containers, a process which is feasible in conjunction with combined packages in accordance with this invention.

The invention will be described below with reference to the attached diagrammatic drawing which shows a combined package containing bottle-shaped plastic packages which are to be assumed to be full of beer.

The drawing shows how eight identical packaging containers 1 are placed next to one another and kept in that configuration by a shrinkage film 2 of plastic material.

The packaging containers 1 are made of a plastic material, preferably polyvinyl chloride, and consist in the case illustrated of a top portion 4, a container body and bottom portion not shown in the drawing, a cap 3 and a stiff sleeve 5 surrounding the container body, the function of which is to take up the compressive stresses emanating from the liquid inside the container which would otherwise deform the package.

As mentioned before, the packaging containers 1 in the case illustrated are to be assumed to contain beer, which means that the packaging containers 1 contain carbon dioxide gas under pressure.

The walls of the packaging containers 1 will certainly have a relatively good impermeability towards both carbon dioxide and oxygen if they are made of polyvinyl chloride, but in view of the fact that for reasons of cost the thickness of the plastic walls is to be kept down, gastightness will in certain cases be insufficient and during storage a certain amount of carbon dioxide will be lost and oxygen will also seep into the packaging containers. Both the loss of carbon dioxide and entry of oxygen should be prevented or at least kept within certain acceptable limits, since both these processes result in a deterioration in the quality of the beer.

The envelope 2 surrounding the packaging containers 1 should form a closed and gastight space and may e.g. consist of a seamless tube of shrinkable plastic film into which the packaging containers 1 are inserted, after which the tube is sealed at both its ends and is heated in known manner in order to bring about shrinkage, whereupon the material of the tube is caused to adhere tight to the packaging containers 1 and to retain these in the configuration in which they were inserted into the tube.

In order to prevent or delay the loss of carbon dioxide from packaging containers, and during an initial stage, to prevent entry of oxygen into the packaging containers, the space between the packaging containers 1 and the envelope 2 is filled with carbon dioxide in accordance with this invention. This may be brought about e.g. by carrying out sealing and shrinkage of the envelope 2 in a space containing an atmosphere of carbon dioxide.

By virtue of the fact that the space inside the envelope is filled with carbon dioxide, entry of oxygen into the packaging containers 1 will naturally be prevented, since there is no oxygen surrounding the containers and capable of penetrating through the walls of the packages. Furthermore, loss of carbon dioxide from the containers 1 is prevented or delayed since the difference in partial pressures between the carbon dioxide inside the packaging containers and that in the space inside the envelope is less than the difference in partial pressures between the carbon dioxide in the packaging containers and that in the atmosphere.

While it is true that, after a time, oxygen will penetrate through the wall of the envelope and thereafter through the walls of the packaging containers and also that carbon dioxide will force its way out of the packaging containers, these processes will be delayed to a substantial extent through the packaging containers being arranged in accordance with this invention, i.e. inside a gastight envelope of a plastic material.

Naturally enough, the properties of the plastic envelope 2 as regards gastightness will influence the total reduction in gas transmission that can be attained with the aid of the combined package, but it has been found that for normal purposes it is sufficient to use an envelope of oriented polythene film or polypropene film, but it is naturally possible if desired to choose other, more impermeable, materials such as polyvinyl chloride film.

It has been possible, using the combined package according to this invention, to prolong the accepted shelf life of a certain type of package from one month to three months, which is naturally of exceptional economic advantage. The additional cost of the combined package is very low, and since it is in any case usual to collect a number of packaging containers into a larger combined package, the extra cost in this case is practically negligible.

I claim:

1. A combined package having extended shelf-life, comprising a number of plastic containers containing a carbonated liquid, said plastic containers having a wall thickness which results in unacceptable loss of the carbon dioxide gas and a heat-shrunk-sealed envelope of plastic material having a relatively good impermeability to carbon dioxide gas and selected from the group consisting of polyethylene, polypropylene and polyvinyl chloride, said heat-shrunk-sealed envelope surrounding said number of plastic containers to maintain said containers in a desired configuration, said envelope containing additional carbon dioxide gas in the spaces between the envelope and said container under such pressure as to substantially retard the flow of carbon dioxide gas out of said containers, the difference in partial pressures of the carbon dioxide gas in the containers and the envelope being less than the difference in partial pressures of the carbon dioxide gas in the containers and that in the atmosphere.

2. A combined package as claimed in claim 1 wherein the containers consist of polyvinyl chloride and the envelope consists of oriented polyethylene.

References Cited

UNITED STATES PATENTS

| | | | |
|---|---|---|---|
| 2,571,340 | 10/1951 | Carson | 99—171 |
| 3,522,061 | 7/1970 | Whiteford | 99—189 X |
| 3,078,008 | 2/1963 | MacDonald | 99—171 X |
| 3,488,913 | 1/1970 | Burgess | 206—65 S X |
| 3,214,016 | 10/1965 | Stephan | 206—65 S |
| 3,233,727 | 2/1966 | Wilson | 206—46 B |
| 1,911,125 | 5/1933 | Miller | 206—46 B |
| 3,529,647 | 9/1970 | Ignell. | |

OTHER REFERENCES

Modern Packaging, Encyclopedia Issue, vol. 41 No. 7A, July 1968, (call No. HF 5770 P119) p. 22.

FRANK W. LUTTER, Primary Examiner

S. L. WEINSTEIN, Assistant Examiner

U.S. Cl. X.R.

99—171 LP, 171 PP, 189; 206—46 P.V.